United States Patent [19]

Linton

[11] Patent Number: 5,024,826

[45] Date of Patent: Jun. 18, 1991

[54] SILICA PARTICULATE COMPOSITION

[75] Inventor: Howard R. Linton, Wilmington, Del.

[73] Assignee: E. I. du Pont de Nemours and Company, Wilmington, Del.

[21] Appl. No.: 489,273

[22] Filed: Mar. 5, 1990

[51] Int. Cl.$^5$ .............................................. C01B 33/18
[52] U.S. Cl. .................................... 423/335; 106/409; 427/397.7
[58] Field of Search ........................ 106/409; 423/335; 501/133; 427/397.7

[56] References Cited

U.S. PATENT DOCUMENTS

| | | | |
|---|---|---|---|
| 2,885,366 | 5/1959 | Iler | 252/313 |
| 2,913,419 | 11/1959 | Alexander | 252/313 |
| 3,383,172 | 5/1968 | Biegler et al. | 423/335 |
| 4,744,831 | 5/1988 | Beck | 106/409 |

FOREIGN PATENT DOCUMENTS 59-182223 10/1984 Japan .................................. 423/335
1139701 2/1985 U.S.S.R. .............................. 423/335

OTHER PUBLICATIONS

Nakahara et al., Zairyo Gijutsu, vol. 5, No. 5 (1987), pp. 231–236, Release Control of Insecticide from Inorganic Microcapsules.

Darley et al., Planta, 130, (2) (1976), pp. 159–167, Studies on the Biochemistry and Fine Structure of Silica Shell Formation in Diatoms.

Sadava et al., Planta, 135, (1) (1977) pp. 7–11, Studies on the Biochemistry and Fine Structure of Silica Shell Formation in Diatoms.

Primary Examiner—Mark L. Bell
Assistant Examiner—Anthony J. Green
Attorney, Agent, or Firm—Charles E. Krukiel

[57] ABSTRACT

A silica powder composition in which the individual powder particles comprise shaped hollow shells of amorphous hydroxylated silica having a shell thickness of from 10 to 50 nanometers.

7 Claims, 4 Drawing Sheets

1

SILICA PARTICULATE COMPOSITION

BACKGROUND OF THE INVENTION

The present invention relates to a new silica powder composition in which the powder particles comprise hollow shells of amorphous hydroxylated silica, and, more particularly, to a process for preparing such hollow silica shells in which their size and shape can be precisely controlled. The ability to control the size and shape of the silica shells renders them suitable for a number of uses, such as, for example, fillers in plastics and elastomers, as extenders in paint and paper, and as anti-caking agents in commercial powder products.

Porous hollow silica shells have been used for microencapsulation of insecticides as described in Nakahara et al. in Zariyo Gijutsu, Vol. 5, No. 5 (1987), pp. 231-236. The shells consist of individual silica particles which have been bonded together to form a porous assemblage. The shells are prepared by aggregating silica particles on the surface of droplets in a water/oil emulsion and recovering the product by centrifuging and filtering. The shells are then washed, dried and sintered at a temperature of 500° C. for 10 hours.

Darley et al., Planta, 130, (2), (1976), pp. 159-167 and Sadava et al., Planta 135, (1), (1977), pp. 7-11, describes the formation of silica shells by sequential deposition of silica within a membrane structure.

U.S. Pat. Nos. 2,885,366 and 2,913,419 relate to coating a solid core material with a coating layer or skin of silica.

SUMMARY OF THE INVENTION

The present invention is a silica powder composition in which the individual powder particles comprise 0.05 to 15 micron shaped hollow shells of amorphous hydroxylated silica having a shell thickness of from 10 to 50 nm and a surface area of from 25 to 400 m$^2$/g. The shaped hollow shells are prepared by the process of:

(a) forming an aqueous suspension of a finely divided inert core material having a specific surface area in the range of from 1 to 50 m$^2$/g;

(b) heating the suspension to a temperature in the range of from 60° C. to 100° C.;

(c) adding from about 2 to 50 weight percent, based on the amount of core material, active silica to the suspension at a rate which avoids precipitation of free silica while maintaining the pH of the suspension at a value in the range of from 8 to 1; and (d) extracting, i.e., removing, the core material.

According to one aspect of the invention, the silica-coated core material particles are isolated by, for example, centrifugation or filtration, washed with water, and dried at a temperature in the range of from 110° C. to 150° C. Thereafter, they can be re-dispersed or suspended in water at the convenience of the operator, and the core material can be removed as described below leaving the hydroxylated silica shell intact. Alternatively, the core can be conveniently dissolved and extracted by treating the aqueous suspension of step (c) above with an acid while stirring until the pH of the suspension reaches a value in the range of from 1.5 to 3.5. So long as the salt of the core material is water soluble, it will dissolve and leave the hollow particles of amorphous hydroxylated silica having the shape of the original core particle. The hollow hydroxylated silica particles are then recovered from the aqueous suspension by centrifugation or filtration, washed with water and dried at a temperature of from 110° C. to 150° C.

In an optional step, the porous silica shells can be made impervious by calcining them at a temperature of from 700° C. to 900° C. for at least 1 and up to about 3 hours. Alternatively, the hollow hydroxylated silica shells can be made impervious by coating them with a non-porous layer of active silica.

DETAILED DESCRIPTION OF THE INVENTION

Figure 1:
FIG. 1 is an electron micrograph which shows hollow silica shells according to the invention which are oval or wedge-shaped.

According to the present invention, a unique powder composition comprising shaped hollow shells of amorphous hydroxylated silica which are from 0.05 to 15 microns in average particle size and which have a surface area of from 25 to 400 m$^2$/g can be prepared by the steps of:

(a) coating an aqueous suspension of a finely divided inert core material with active silica, i.e., amorphous hydroxylated silica; and (b) removing the core material and recovering the hollow hydroxylated silica shells which remain.

The core material employed in the invention is a finely divided solid, i.e., having an average particle size which can vary over a wide range depending on the shape of the particle which results when the material is finely divided, such as by grinding. Generally speaking, the finely divided core material particles will exhibit a specific surface area in the range of from 1 to 50 m$^2$/g. Best results are achieved when the core material particles have a specific surface area of from 2 to 8 m$^2$/g. The core material is generally inert in terms of being nonreactive with active, i.e., hydroxylated, silica, and the particles can have a wide variety of shapes, e.g., equiaxial, acicular and platelet. In addition, the physical form of the core material is important to the extent that the material must have a finite solubility in water or dilute base.

Specific core materials which are preferred in terms of cost, convenience and operability of the process are calcium carbonate, which can yield particles of various shapes having an average size of from 0.05 to 15 microns when finely divided; barium carbonate, which yields acicular particles having an aspect ratio of from 2 to 50 and an average diameter of from 0.1 to 0.5 microns; and lead carbonate, which yields platelike particles having an aspect ratio of from 10 to 150 and an average diameter of from 2 to 15 microns. Other core materials which are contemplated for use in practicing the invention include finely divided metal powders such as aluminum, copper, zinc, iron and nickel and their mixtures and metal oxides, such as the oxides of alkaline earth metals, copper, zinc, tin, iron, nickel and their mixtures.

The process is best carried out by first forming an aqueous suspension of the core material in which the concentration of solids can range from 10 to about 40 weight percent. The suspension will preferably contain a small amount, e.g., about 5–15 wt.%, of a soluble metal silicate, such as, for example, sodium or potassium silicate, which can be added to the suspension at the beginning of the process. A primary characteristic of the amorphous hydroxylated silica coating, i.e., the shell, which will form about the core material during the process is that it will contain a minor amount, e.g., 0.001–5 wt.% of chemically combined polyvalent metal ions. These metal ions may be derived or contributed by the core material or they can be supplied from an independent source and added during the silica coating process.

When the core material does not contain polyvalent metal ions, for example, in the case of a metal powder such as iron, it is necessary to add polyvalent metal ions, such as calcium, to the aqueous suspension during deposition of the silica coating. The use of $BaCO_3$, $CaCO_3$, and $SrCO_3$ as the core material when practicing the invention is particularly advantageous because they can provide an in situ source of suitable metal ions during the silica coating process.

The presence of metal ions in the silica shell which forms about the core material is critical in that these ions dissolve in the presence of an acid and thereby allow the acid to penetrate through the silica shell into the core material and dissolve it. The dissolved core material and any gases which may be produced in the process can then escape through pores in the shell which were created by the dissolving metal ions. If too thick a silica coating is deposited on the core, there may be no metal ions present in the outer thickness of the silica coating, and the coating may be impermeable to the acid. Consequently, it would not be possible in such a situation for the acid to contact and dissolve the core material so that it could be removed from the silica shell. When thick coatings of silica are to be applied to a core material in accordance with the process of the invention, e.g., a coating thickness which results in the coated product having up to 33 percent by weight silica, it is necessary to add metal ions to the reaction medium during the coating process so that metal silicates will be formed throughout the resulting silica coating layer to facilitate subsequent removal of the core material by acid dissolution. The presence of metal silicates in the silica coating is indicated by a high specific surface area relative to coated products which have no metal silicate in the coating layer as shown in Table 1.

TABLE 1

| Core Composition | Surface Area (wt. %) $SiO_2$ in Coated Core | Cation Added | BET m²/g Acid Leached Product |
|---|---|---|---|
| $CaCO_3$ | 33 | None | 7.2 |
| $CaCO_3$ | 33 | $Ca^{2+}$ | 114.8 |
| $CaCO_3$ | 33 | $Mg^{2+}$ | 174.0 |
| $CaCO_3$ | 33 | $Ba^{2+}$ | 107.8 |

If too thin a silica coating layer has been applied to the core material, it may be impossible to remove the core by acid dissolution without destroying the shell, or the shell may be destroyed in a subsequent recovery step. For best results, the silica coating layer should be applied to the core material in an average thickness in the range of from 10 to about 100 nm. In cases where the core material particles have a maximum dimension of from 5 to 15 microns, the thickness of the silica coating layer should be at least about 50 nm, but generally speaking a thickness of from 10 to 50 nm is satisfactory and enables the core material to be dissolved and removed conveniently without damaging the resulting hollow silica shells.

Referring to Table 2, the surface area of the coated core is slightly less than the surface area of the original core particle as shown by BET surface area measurements. The silica component of the coated core, i.e., the coated product, will generally range from 2 to about 50 percent by weight.

The hydroxylated silica coating and the metal ions which are present in the reaction medium are co-deposited on the surface of the core material. Since the silica has been observed to combine chemically with the metal ions, it is believed that the metal ions are present in the coated product before acid treatment in a chemically combined form as a metal silicate. There is no evidence of any pores being present in the amorphous hydroxylated silica coating layer before acid treatment. The acid attacks and dissolves the metal silicates from the coating layer which leaves pores in the layer through which the acid can pass to reach and dissolve the core material In addition, depending on the chemical composition of the core material, dissolution of the core may produce a gaseous by-product, such as carbon dioxide when a metal carbonate is used as the core. In these cases the gas may also produce holes in the silica coating layer as it escapes which, in turn, can facilitate penetration of the acid to the core. In practice, the core material can be dissolved almost completely leaving behind a hollow shell which consists of about 99 percent by weight of insoluble amorphous hydroxylated silica with traces of metal ion, e.g., $Mg^{2+}$, $Ca^{2+}$, $Ba^{2+}$, $Pb^{2+}$, etc., as shown by TEM/EDS analysis. Alternatively, a portion of the core material may be left in the final silica shell product in which case the final product would contain, for example, $Ca^{+2}$ as $CaCO_3$ when using $CaCO_3$ as the core or $Ba^{+2}$ as $BaCO_3$ when using $BaCO_3$ as the core.

Figure 2:
FIG. 2 is an electron micrograph which shows hollow silica shells according to the invention which exhibit a variety of platelet shapes.
Figure 3:
FIG. 3 is an electron micrograph which shows hollow silica shells according to the invention which are generally equiaxial in shape.
Figure 4:
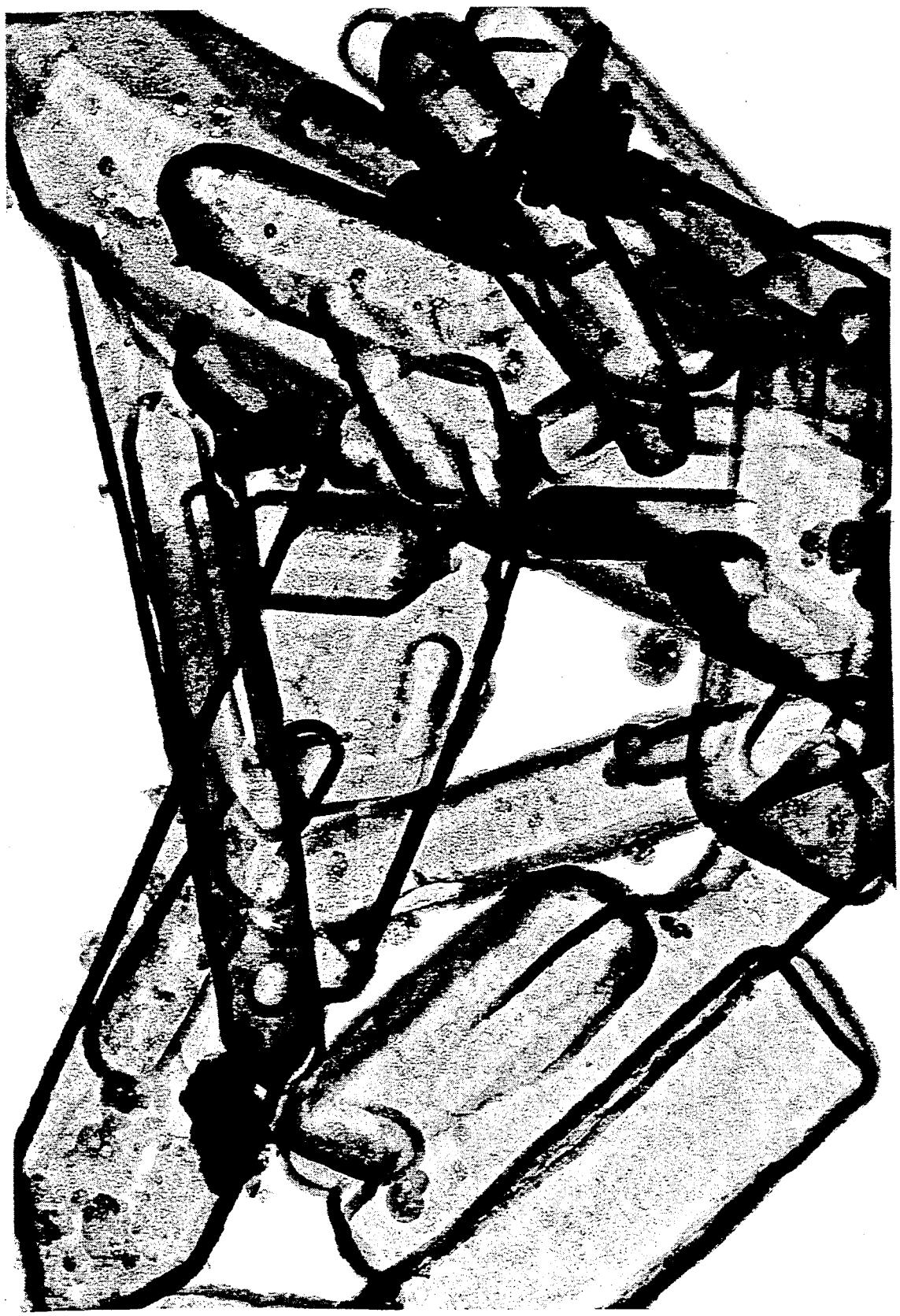
FIG. 4 is an electron micrograph which shows hollow silica shells according to the invention which are cylindrical or acicular in shape.

FIGS. 1–4 are electron micrographs of hollow silica shells which were prepared by the process of the invention using acid leaching, i.e., by dissolving a core material of a metal carbonate which had been coated with an amorphous hydroxylated silica coating layer. The shells have the morphology of the original core particles, and a thickness which is uniform in the range of about 20 nm. Since the weight of the shell is less than that of the coated particle, and the size is generally the same, the specific surface area of the acid leached shell is greater than the specific surface area of the coated core which can be seen in Table 2. The specific surface areas of the silica shells made according to the invention will range from 25 m²/g up to about 400 m²/g.

TABLE 2

| Core Composition | Morphology | Surface Area BET m²/g Original Core | $SiO_2$ Coated Core | Acid Leached Shell |
|---|---|---|---|---|
| $CaCO_3$ | Wedge-like | 11.4 | 8.5 | 49.8 |
| $CaCO_3$ | Platelets | 3.75 | 3.4 | 217.3 |
| $CaCO_3$ | Equiaxial | 7.9 | 7.2 | 133.3 |

TABLE 2-continued

| | | Surface Area BET m²/g | | |
|---|---|---|---|---|
| Core Composition | Morphology | Original Core | SiO₂ Coated Core | Acid Leached Shell |
| BaCO₃ | Acicular | 2.8 | 2.5 | 46.3 |

The core particles provide a specific shape onto which the amorphous hydroxylated silica can be deposited, and they must maintain their physical stability during the coating process to produce satisfactory results.

In practicing the invention, an aqueous suspension of the core material is formed first which preferably contains a small amount, e.g., from about 5 to 15 wt.%, of a soluble metal silicate, such as, for example, sodium or potassium silicate. The concentration of solids in the aqueous suspension is not especially critical and can range from 10 to about 40 percent by weight. If sodium silicate is selected as the soluble metal silicate, a convenient form to use is a clear aqueous solution having an $SiO_2/Na_2O$ molar ratio of 3.24/1 which has been filtered to remove all insoluble residue.

The suspension is then heated to a temperature in the range of from 60° C. to 100° C., and active silica is added while maintaining the pH of the reaction medium at a value in the range of from 8 to 11. This portion of the procedure is described in greater detail in U.S. Pat. No. 2,885,366 and in U.S. Pat. No. 2,913,419, the teachings of which are incorporated herein by reference. In general, active silica is a very low molecular weight silica, such as silicic acid or polysilicic acid, which may be added as such to the aqueous suspension of the core material or formed in situ by reacting an acid with an alkali metal silicate. Sodium and potassium silicate are acceptable soluble metal silicates for this purpose, and suitable acids are hydrochloric acid, nitric acid, and sulfuric acid. The choice of acid is critical to the extent that it depends on the nature of the core material. For example, the acid should not be capable of forming an insoluble salt with the metal in the core material because any precipitate which results would be contained in the final product. Hydrochloric acid and sulfuric acid, for example, would not be suitable for use in this process with a lead carbonate core material, but nitric acid could be used. In the case of barium carbonate as the core material, sulfuric acid would not be a suitable choice, but hydrochloric acid and nitric acid could be used with satisfactory results.

In practice, the alkali component of the sodium or potassium silicate is neutralized by adding dilute acid slowly to the stirred slurry over a predetermined period of time which is dictated by the amount of silica present in the reaction medium to avoid forming free silica, i.e., silica particles which are not attached to the core material. Active silica, or hydroxylated silica, as used in the invention, is silica which is charactized as having hydroxyl groups on the surface of the individual particles. Hydroxylated silica may be obtained by precipitating silica from aqueous solution under alkaline conditions at a rate which is equivalent to the desired rate for depositing the silica onto the surface of the core material particles. Preferably, the process is carried out slowly, i.e., over a period of from 1 to 3 hours, at an elevated temperature in the range of 90° C. Under these conditions, the amorphous hydroxylated silica which deposits on the surface of the core particles will be coherent, i.e., the silica will adhere to the core surface and take the shape of the core particle. Typically, particles which have been coated with a coherent amorphous hydroxylated silica coating layer will have a surface area, as measured by nitrogen absorption, which is about the same as, or slightly lower than, the surface area of the uncoated original particle. Surface area is significant to the extent that it indicates that the silica skin which has formed is continuous, i.e., it has no pores, prior to acid leaching and that little or no free silica was formed during processing.

Amorphous hydroxylated silica is formed according to the invention at a temperature in the range of from 60° C. to 100° C. which will facilitate densification of the silica. Lower temperatures may also produce satisfactory results when a densification aid, such as, for example, $B_2O_3$, is present in the reaction medium. A slight dissolution of the core material during the process will produce metal ions which will co-precipitate as silicates together with the silica coating. However, as previously stated, it is desirable to add a small amount of metal ions, e.g., 0.001–5 wt.%, such as magnesium, calcium, barium, and lead, during the coating process to ensure the presence of some corresponding metal silicate in the silica coating, particularly if a coating layer in the upper range of acceptable thicknesses is desired.

A silica deposition corresponding to from 1 to 5 percent by weight of the solids in the suspension is normally satisfactory to insure formation of an amorphous hydroxylated silica coating layer. In practice, adding silica to the reaction medium in an amount of from about 6 to about 25 percent by weight of the core material in the slurry produces satisfactory results, but lower or higher amounts can also be used, e.g., as low as 2 percent by weight or as high as 50 percent by weight. Regardless of the amount of silica being employed when carrying out the process, an important consideration is to keep the addition rate slow enough to avoid precipitation of free silica. When the neutralization is complete the suspension is stirred for an additional period of at least about a half hour to ensure complete deposition of the hydroxylated silica coating layer on the core particles.

The silica coated particles can then be isolated by centrifugation or filtration, washed with water and dried at a temperature usually in the range of from 110° C. to 150° C. before beginning the next step in the process. Alternatively, the coated silica particles can be retained in suspension and the next step begun.

In cases in which the coated silica particles have been recovered, the process is continued by re-dispersing them in water to form a suspension, or taking the previous suspension, and heating it to a temperature in the range of from 40° C. to 100° C. Next, the core material is removed from the silica shells by adding an acid to the suspension while stirring until the pH reaches a value in the range of from 1.5 to 3.5, and preferably 2.0. So long as the salt of the core material is water soluble, the core material will dissolve and can be extracted from the silica shells leaving hollow particles of amorphous hydroxylated silica having the shape of the original core particle. The hollow silica shells are then recovered by centrifugation or filitration, washed with water, and dried at from 110° C. to 150° C.

The core material can in some cases be extracted from the shells by other means, such as, for example, by oxidation during calcining at temperatures of from 700°

C. to 900° C. where the core material is a graphite powder.

The amorphous hydroxylated silica shells of the invention and their process of preparation are illustrated in greater detail in the following examples.

EXAMPLE 1

This Example illustrates the use of calcium carbonate as the core material.

To a glass beaker equipped with a stirrer was added 3 liters of water and the pH was adjusted to 10 by the addition of 5% sodium hydroxide solution. 100 g of potassium silicate, $K_2O/SiO_2$ (26.5 wt.% $SiO_2$) was added, with stirring, followed by 1350 g of calcium carbonate powder (Baker C.P.) having a specific surface area of 4.0 $m^2/g$. The stirred slurry was heated to 90° C. in about half an hour and the pH was measured as 9.72.

Solutions, consisting of 1027 g potassium silicate ($K_2O/SiO_2$ 3.25 ratio) in 1 liter of water and 268 cc conc. hydrochloric acid (37.4 wt.%) diluted to 1 liter, were added simultaneously with stirring at 90° C. over a period of 5 hours maintaining the pH above 9.0 throughout the addition. The slurry was then cured for half an hour at 90° C. with stirring. The solids were recovered by filtration, washed several times on the filter with water and dried at 120° C. overnight. The yield of silica-coated calcium carbonate was 1607 g and the specific surface area was measured as 3.8 $m^2/g$. The slightly decreased surface area from that of the original calcium carbonate indicates that a dense silica coating has been obtained.

250 g of silica-coated calcium carbonate was dispersed in 1 liter of water, using a Waring blender. The dispersion was heated to 90° C. and conc. hydrochloric acid was added slowly until a pH of 2.0 was maintained for half an hour. This required the addition of 355 cc of acid. The solids were recovered by filtration, washed on the filter with water and dried at 120° C. in an oven. 50 g of powder was obtained and the specific surface area was found to be 120 $m^2/g$. After calcining the sample at 750° C. for 1 hour the specific surface area was found to be 33 $m^2/g$.

EXAMPLE 2

This Example illustrates the use of barium carbonate as the core material.

The procedure of Example 1 was repeated using 1350 g of barium carbonate powder (Kraft Chemical Co.) having a specific surface area of 2.8 $m^2/g$. The pH of the initial slurry was 9.84 and 551 g $K_2O/SiO_2$ in 600 ml water and 131 cc conc. HCl diluted to 600 ml with water were added simultaneously with stirring over a period of 3 hours maintaining the pH above 9. The pH was adjusted to 7 and the solids were recovered as in Example 1. The surface area was 2.5 $m^2/g$. 250 g of silica coated $BaCO_3$ was leached using 175 cc conc. HCl and the dry powder was recovered using the procedure of Example 1. The product surface area was 46.3 $m^2/g$.

EXAMPLE 3

This Example illustrates the use of calcium carbonate as the core material.

The procedure of Example 1 was repeated using 900 g of calcium carbonate (Pfizer Albacar H.O. Dry) having a specific surface area of 11.4 $m^2/g$ and 100 g of $K_2O/SiO_2$ (3.25 ratio). The pH of the initial slurry was 9.67 and 1027 g of $K_2O/SiO_2$ (2.1 retio) in 1 liter of water and 250 cc conc. HCl diluted to 1 liter with water were added simultaneously with stirring over a period of 4 hours maintaining the pH above 8.5. After curing the slurry for half an hour at 90° C. a small sample was removed, filtered and dried. THe surface area was 8.5 $m^2/g$. The remainder of the slurry was decanted and washed. Conc. HCl (1510 cc) was added and the slurry was stirred at a pH of 2 and a temperature of 90° C. for half an hour. The dry powder, recovered as in Example 1, had a surface area of 49.8 $m^2/g$.

Some of the silica shell powder prepared as described in this Example was used in a vinyl-acrylic latex paint formulation. Two similar formulations were prepared, one without the powder (A) and the other one with (B). Both formulations had a pigment volume concentration (PVC) of 60%. The components listed in Table 3 were blended together in the proportions shown using a high shear disperser. The formulations were compared with respect to contrast ratio, tint efficiency and brightness, using standard procedures. The results, which are given in Table 3, show Formulation B to be superior, even though it contains only 73% as much Rutile $TiO_2$ as Formulation A. The powder prepared as described above is thus seen to be very effective as an extender in paint formulation.

TABLE 3

| Component | Formulation A | Formulation B |
|---|---|---|
| Parts by Volume | | |
| Water | 200 | 176 |
| Hydroxyethyl Cellulose (3%) | 105 | 123 |
| Dispersants | 13 | 13 |
| Defoamer | 2 | 2 |
| Ethylene Glycol | 31 | 31 |
| Carbitol Acetate | 8.5 | 8.5 |
| Rutile $TiO_2$ | 225 | 165 |
| $CaCO_3$ | 347 | 325 |
| Diatomaceous Silica | 50 | 50 |
| Silica Shell Powder | 0 | 50 |
| Vinyl Acrylic Emulsion (55%) | 290 | 290 |
| Properties | | |
| Contrast Ratio | 0.965 | 0.963 |
| Tint Efficiency | 100 | 104 |
| Brightness | 90.6 | 91.0 |

EXAMPLE 4

This Example illustrates the use of lead carbonate as the core material.

The procedures of Example 1 was repeated using 650 g of basic lead carbonate $2PbCO_3Pb(OH)_2$ (Halstab, a division of Hammond Lead Products) having a specific surface area of 3.75 $M^2/g$. 226 sodium silicate ($Na_2O/SiO_2$; 28.7% $SiO_2$) was added and the slurry heated to 90° C. in half an hour. The pH was 9.86. Over a period of 4 hours 578 g conc. $HNO_3$ (70.6%) in 400 cc water was added and the final pH was 7.0. The stirred slurry was held at 90° C. for half an hour. Conc. $HNO_3$ (210 cc) was added slowly until the pH was 2 and the slurry was stirred at 90° C. for half an hour. The dry powder, recovered as in Example 1, had a surface area of 217.3 $m^2/g$.

EXAMPLE 5

This Example illustrates the use of a copper powder as the core material.

Copper flakes (U.S. Bronze Powders) were first extracted with hot chloroform and then with a hot mixture of 80 parts of 10% sodium hydroxide solution and 20 parts of isopropyl alcohol, to remove oils and fatty acids.

The procedure of Example 1 was repeated dispersing 400 g of the cleaned copper flakes, having a surface area of 2.6 m$^2$/g, in 2 liters of water. 104 g sodium silicate ($Na_2O/SiO_2$; 28.7% $SiO_2$) was added and the slurry heated to 90° C. in half an hour. The pH was 9.98. $H_2SO_4$ (2%) was added at the rate of 100 cc/hr until the pH of the stirred (90° C.) slurry was 7 and stirring was continued for a further half hour. The slurry was flooded with water, decanted and washed. Conc. $HNO_3$ was added until the pH of the stirred slurry was 2 and stirring was continued for a further half hour. The dry powder, recovered as in Example 1, was light blue in color, due to $Cu^{2+}$ ions in the silica shell. It had a surface area of 92.6 m$^2$/g.

EXAMPLE 6

This Example illustrates coating a hollow shell silica particle with a non-porous silica layer.

A hollow silica shell powder, made using a calcium carbonate core as described in Example 1, had a surface area of 121.7 m$^2$/g. 204 g of this powder was dispersed in 2 liters of water and the pH was adjusted to 9 using a 10% NaOH solution. The slurry was heated to 90° C. and, over a period of 2 hours, 71 g sodium silicate ($Na_2O/SiO_2$; 28.75 $SiO_2$) diluted to 500 cc with water and 16 cc conc. HCl diluted to 500 cc with water were simultaneously added with stirring, maintaining the pH above 9 during the addition and stirring was continued at 90° C. for a further half hour. The dry powder, recovered as in Example 1, had a surface area of 54.7 m$^2$/g. The surface area was decreased due to the non-porous outer silica layer coating applied to the original hollow shell silica particle.

EXAMPLE 7

This Example illustrates the use of a high surface area calcium carbonate powder as the core material.

The procedure of Example 1 was repeated using 600 g of calcium carbonate powder (Pfizer Pficarb M) having a specific surface area of 32 m$^2$/g. 1027 g $K_2O/SiO_2$ (26.5 wt.% $SiO_2$) diluted to 1 liter with water and 250 cc conc. HCl diluted to 1 liter with water were added simultaneously with stirring to the calcium carbonate suspension over a period of four hours.

The solids were recovered as in Example 1. The solids were leached using 1050 cc conc. HCl to dissolve the calcium carbonate. The dry powder, recovered using the procedure described in Example 1, had a specific surface area of 285 m$^2$/g.

EXAMPLE 8

This Example illustrates the use of a calcium carbonate powder as the core material and the use of a mixture of potassium silicate and sodium borate in the coating step of the process. The sodium borate is a source of $B_2O_3$, which is a densification aid.

The procedure of Example 1 was repeated using 600 g of calcium carbonate powder (Pfizer H.O. Dry). 1027 g $K_2O/SiO_2$ (26.6 wt.% $SiO_2$) and 366 g $Na_2B_2O_4.8H_2O$ dissolved in 1200 cc water and 425 cc conc. HCl diluted with 1200 cc water were added simultaneously with stirring to the calcium carbonate suspension over a period of 4 hours.

The solids were recovered as in Example 1. The solids were leached using 1050 cc conc. HCl to dissolve the calcium carbonate. The dry powder, recovered using the procedure described in Example 1, had a specific surface area of 325 m$^2$/g.

What is claimed is:

1. A silica powder composition in which the powder particles have an average size of from 0.05 to 15 microns, a specific surface area of from 25 to 400 m$^2$/g, and consist essentially of a shell of amorphous hydroxylated silica having a shape and a thickness in the range of from 10 to 50 nanometers.

2. The silica powder composition of claim 1 in which the shell of amorphous hydroxylated silica is impervious.

3. A process for preparing a silica powder composition in which the powder particles consist essentially of a shell of amorphous hydroxylated silica having a shape, the process consisting essentially of:
   (a) forming an aqueous suspension of a particulate generally inert acid leachable core material in which the core material has a specific surface area in the range of from 1 to 50 m$^2$/g;
   (b) adding amorphous hydroxylated silica to the aqueous suspension in the presence of from 0.001 to 5 wt.% of a polyvalent metal ion at a temperature of from 45° C. to 100° C. and at a rate which avoids precipitation of free silica while maintaining the pH of the aqueous suspension at a value in the range of from 8 to 11 while forming an amorphous hydroxylated silica coating layer having metal ions randomly dispersed therein and a thickness of from 10 to 50 nm around the core particles;
   (c) removing the core material by adding an acid in which the core material is soluble to the aqueous suspension of the silica coated particles while maintaining the pH of the suspension at a value in the range of from 1.5 to 3.5 whereby the core material is dissolved and can be extracted leaving a hollow shell of amorphous hydroxylated silica; and
   (d) recovering the silica shells which remain from the aqueous suspension.

4. The process of claim 3 in which the core material is an alkaline earth metal carbonate.

5. The process of claim 4 in which the core material is removed by adding an acid in which the core material is soluble to the aqueous suspension of the silica coated particles while maintaining the pH of the suspension at a value in the range of from 1.5 to 3.5 whereby the core material is dissolved and can be extracted leaving the hollow shell of amorphous hydroxylated silica.

6. The process of claim 3 in which the recovered silica shells are calcined at a temperature of from 700° C. to 900° C. for at least 1 and up to 3 hours.

7. The process of claim 3 in which the recovered silica shells are rendered impervious by coating them with a non-porous layer of active silica.

* * * * *